United States Patent [19]
Kato et al.

[11] 4,301,755
[45] Nov. 24, 1981

[54] MULTIPLE PATTERN SEWING MACHINE

[75] Inventors: Masataka Kato; Hiroo Shirai, both of Nagoya, Japan

[73] Assignee: Brother Kogyo Kabushiki Kaisha, Aichi, Japan

[21] Appl. No.: 89,263

[22] Filed: Oct. 26, 1979

[30] Foreign Application Priority Data

Nov. 20, 1978 [JP] Japan .................. 53-143152

[51] Int. Cl.³ .............................................. D05B 3/02
[52] U.S. Cl. .................................................. 112/158 E
[58] Field of Search ............... 112/158 E, 158 R, 275, 112/277, 158 F, 278, 121.11, 121.12, 158 A–158 D; 340/680, 642

[56] References Cited

U.S. PATENT DOCUMENTS 4,161,150  7/1979  Brown .............................. 112/158 E
4,178,866 12/1979  Adams .............................. 112/278

Primary Examiner—Peter P. Nerbun
Attorney, Agent, or Firm—Browdy and Neimark

[57] ABSTRACT

A multiple pattern sewing machine with a trouble warning device. The sewing machine is provided with a pattern displaying device for indicating a selected stitch pattern from among a plurality of stitch patterns. The trouble warning device comprises a trouble detector disposed where detection of trouble is desired in the sewing machine and a device for making the pattern displaying device operate in a different state from the normal state in which a selected stitch pattern is indicated.

9 Claims, 3 Drawing Figures

MULTIPLE PATTERN SEWING MACHINE

BACKGROUND OF THE INVENTION

This invention relates to a multiple pattern sewing machine, particularly a sewing machine with a trouble warning device for giving a warning of a trouble to the operator occurrence (abnormal condition), which machine is characterized in that stitch pattern indicating meaans are also utilized as means for giving a warning of the occurrence of trouble.

When some of troubles take place, in sewing machines, such as overheating of the drive motor, mis-outputting of a needle position detecting signal, wire-breakage in the foot controller, etc., there is a likelihood of the initial trouble developing into a more serious trouble, if the situation is left unnoticed by the machine operator. Indeed, such developing troubles may be injurious to the operator herself. It is therefore necessary as well as desirable that the operator can be given the occurence of a warning of a trouble as quickly as possible, so that she may take appropriate steps such as checking or repair.

It has been conventionally practiced that a trouble occurrence warning is given to the operator by lightening or sometimes by blinking a trouble warning lamp (alarm lamp). Disposition of such an exclusively purposed warning lamp is likely to be accompanied by some disadvantages, such as increasing the number of component parts or rendering the mounting of other operating means or indicating means difficult by occupying the front surface of the machine frame which is an already limited space.

Disposing position of such a warning lamp should be the easiest noticeable one for the operator when it is lighted. It is not preferable on the other hand that such a rarely used member be disposed at the most conspicuous position of the machine from the standpoint of the general appearance thereof.

SUMMARY OF THE INVENTION

It is therefore a primary object of this invention to provide a multiple pattern sewing machine with a trouble warning device which is composed of as few component parts as possible, not being degrading to the machine appearance, and capable of surely giving the occurrence, and a warning of a trouble (abnormal condition).

It is another object of this invention to provide a multiple pattern sewing machine with a trouble warning device which is so built as to assure the operator not to overlook the indication of the occurrence of a trouble.

Characteristic feature of this invention resides in that the indicator is capable of giving a trouble warning, when some trouble has taken place in the machine, by differently operating an already present indicator wherein any one selected pattern is ordinarily indicated. For example, the trouble warning is given by means of lightening plural number of lamps at a time, or lightening or blinking plural lamps sequentially at a considerably high speed.

The pattern indicator should be primarily disposed at the easiest noticeable position, on the front side, of a machine for indicating the selected pattern when the operator has selected her desired pattern by handling an operational button. It is therefore so constructed as to constantly indicate any one selected pattern during the operation period of the machine; and the operator looks at the indicator out of habit of confirming the selection of the desired pattern.

As stated above, when the operator begins sewing operation, she confirms by watching the pattern indicator whether the selection of the desired stitch pattern is completed. It is quite convenient and advantageous that the watch of the indicator naturally leads her to habitually ascertain whether a trouble is present or not. As a matter of fact, she can not be certain whether the machine is so conditioned as to be able to carry out the sewing with a desired pattern, unless the indicator so shows. There could be no more certain trouble warning device in giving her a trouble warning than applicant's device.

The trouble warning device of this invention is provided with a trouble detecting means (trouble detector) for giving a trouble warning signal upon detecting a trouble in a predetermined place of the machine. In order to consecutively supply indication signals to the plurality of indicating means, a second indication signal supplying means, which is responsive to the trouble detecting signal, is disposed separately from a first indication signal supplying means for indicating a selected pattern. By means of only attaching a trouble detector and a second indication signal supplying means to a stitch pattern indicating device (pattern indicator) which is originally disposed for its specific purpose, a simultaneous lightening or a sequential (consecutive) lightening of plural indicating means is realized in this invention. It can be said to have brought about as a result a highly effective trouble warning device second to none. With reference to the accompanying drawings a preferred embodiment is to be described hereunder, which is only by way of example, not for limiting the scope of the invention at all.

DETAILED DESCRIPTION OF THE PREFERRED EMBODIMENT

Figure 1:
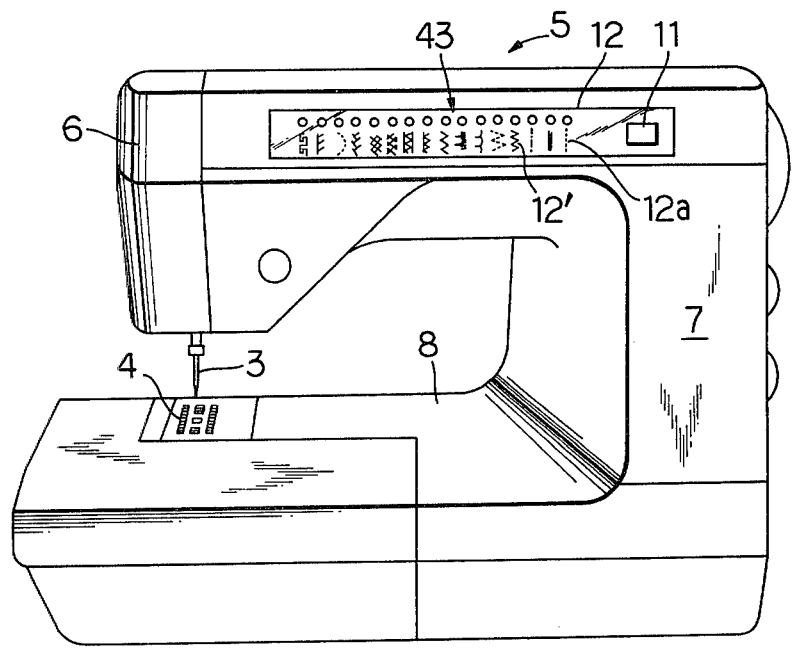
FIG. 1 is an perspective view of a sewing machine in accordance with this invention.

In a sewing machine in FIG. 1 in which this invention is preferably applied, a bracket arm 5 is provided on either end thereof with a head portion 6 and a standard 7, the lower end of the latter being carried by a bed 8.

On the front surface, facing the operator, are disposed a push button 11, which is a handling means for the operator when she selects a desired stitch pattern from a plurality of predetermined patterns (16 kinds in this embodiment) and a display panel 12 on which indicia of the above-mentioned 16 patterns are displayed. Above each of the indicia a light emitting diode (LED) 43 is disposed.

Figure 2:
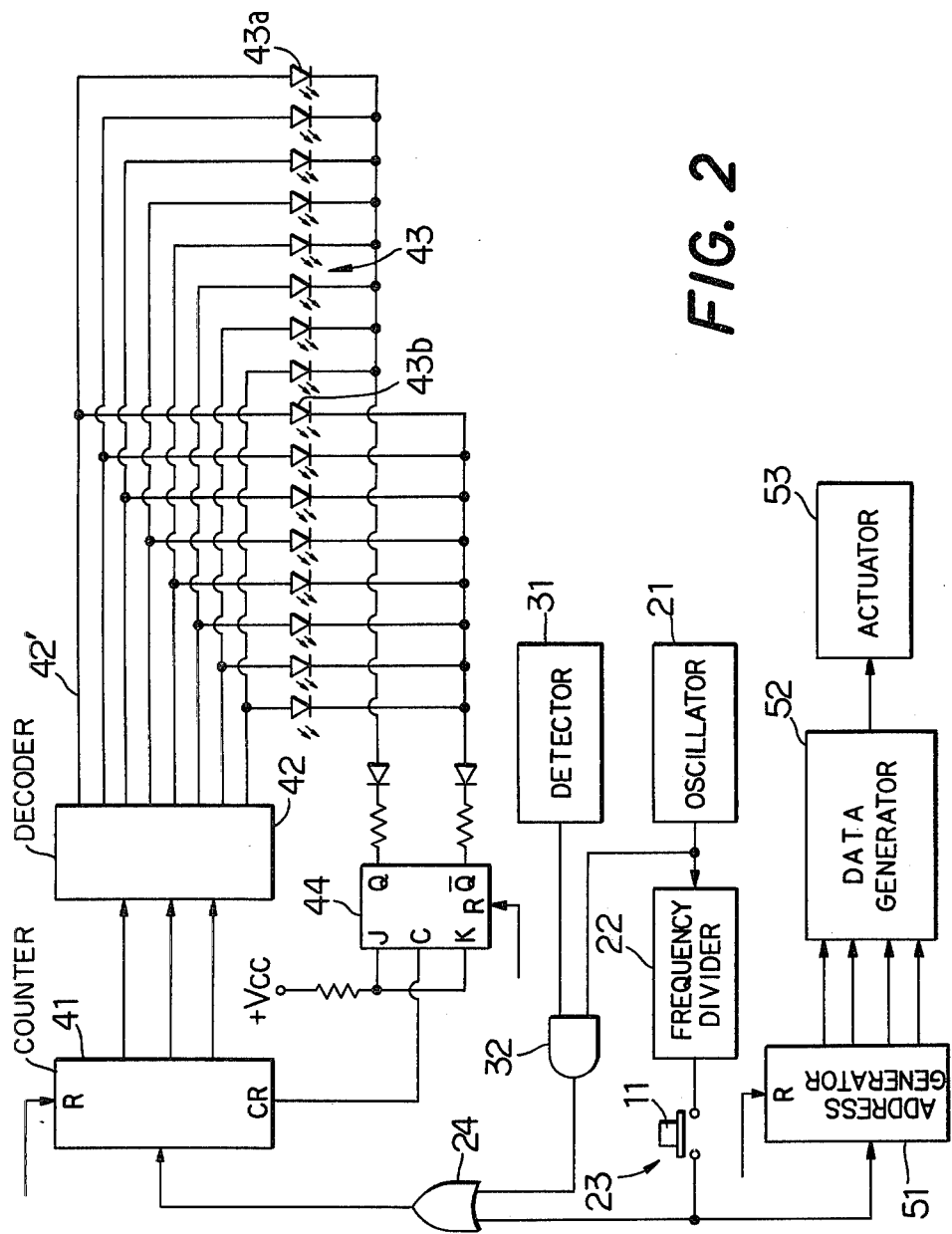
FIG. 2 is a block diagram showing an embodiment of a trouble warning device of the sewing machine in FIG. 1.

The LEDS 43 are lighted (illuminated) by a circuit shown in FIG. 2. An oscillator 21 for generating a pulse signal of specific frequency, is connected to an OR circuit 24 through a frequency divider 22 which reduces the frequency of the pulse signal by a constant factor and a normally open switch 23 which is closed while the push button 11 is depressed.

The OR circuit 24 is connected to a counter 41 (octal), which counts in order, whenever a pulse signal input from the OR circuit 24 rises, from "0" to "7" for outputting the significance as a digit of binary scale with three bits. Upon reaching "7" it returns to "0" again. The counter 41 is connected to a decorder 42; the latter gives a signal of high level from only a specific terminal out of the eight output terminals based on the signal input from the counter 41. To each of the terminals of the decoder 42 is respectively connected one of the 16 LEDs 43, which corresponds to each indicium of stitch pattern on the display panel 12. That is to say, one out of a first group containing eight from the first to the eighth of the 16 LEDs 43, starting from right to left, and one out of a second group containing another eight from the ninth to the sixteenth are connected to the same terminal of the decoder 42, and the remainder in the two groups of the 16 LEDs 43 are similarly connected, forming 7 pairs respectively, to each same terminal of the decoder 42.

The counter 41 is provided with a CR terminal which produces a carry signal Pc (see FIG. 3) which falls from a high level to a low level in response to the falling of a pulse signal Pa (see FIG. 3) for changing the significance to "7" and rises from a low level to a high level in response to the rising of a pulse signal Pb (see FIG. 3) for changing the significance from "7" to "0". The CR terminal is connected to a C terminal of a J-K flip-flop circuit 44. To a J terminal and a K terminal of this J-K flip-flop circuit 44 is respectively applied a high level voltage. To a Q terminal of the flip-flop circuit 44 the eight LEDs 43, from the first to the eighth, are connected; and to a $\overline{Q}$ terminal of the same the other eight LEDs 43, from the ninth to the sixteenth, are connected. The flip-flop circuit 44 is so built as to alternately change its holding state at every receiving of a rising of a carry signal output from the counter 41.

The oscillator 21 and the frequency divider 22 are connected, via the normal open switch 23, to an address generator 51, which is provided with a memory and a counter. The memory memorizes starting or initial addresses corresponding to various stitch patterns, and the counter functions to count signals supplied from, via the normal open switch 23, the frequency divider 22 and to select a starting address corresponding to the significance for drawing necessary data out of the memory. The address generator 51 supplies the selected starting addresses to a data generator 52, which generates necessary data required for forming stitches of each desired pattern. An actuator 53 for operating a mechanism regulating lateral oscillation of a sewing needle 3 (see FIG. 1) and another mechanism adjusting feed amount as well as feed direction of a feed dog 4 makes it possible to form a specific desired stitch pattern. A stitch forming system of this type is well known, being disclosed in U.S. Pat. No. 3,872,808 published on Mar. 25, 1975, requiring no further description.

Besides, all of the counter 41, the flip-flop circuit 44, and the counter in the address generator 51 are reset, when power is supplied, by a signal input to each R terminal of them.

A detector 31 disposed where detection of a trouble is desired, generates a high level signal upon detection of the occurrence of a trouble (abnormal condition) such as overheat of the drive motor, late producing or non-producing of a detection signal in a needle position detector for halting the needle at a desired position, or producing a excessive value of speed command for the drive motor due to a fault in a foot controller for controlling the drive motor. The detector 31 and the oscillator 21 are connected, via an AND circuit (gate) 32, to the OR circuit 24.

Operation of the embodiment having the above-described construction is to be described next.

As a first step to make a selection of a desired stitch pattern the push button 11 is depressed after electric power has been supplied. Then the normally open switch 23 is closed to input a pulse signal of low frequency, divided by the frequency divider 22 after having been generated by the oscillator 21, to the OR circuit 24. At this moment the detector 31 gives no signal, so the signal input to the counter 41 from the OR circuit 24 is only what has been output from the frequency divider 22. The pulses are numerically counted at every rising thereof.

As the counter 41 is reset at the time power is supplied, the initial number of count is "0"; to the top line 42' (in FIG. 2) of the decoder 42 a high level signal is output. The flip-flop circuit 44 is also reset at the time power is supplied, in which the $\overline{Q}$ terminal is in a high level state and the Q terminal is in a low level state. Consequently the first LED 43a in FIG. 2 is illuminated and a stitch pattern designated by the extreme right indicium 12a (in FIG. 1) is displayed.

When the operator keeps the push button 11 in a depressed state, pulse signals of low frequency from the frequency divider 22 are consecutively input, via the OR circuit 24, to the countr 41. The significance of the counter 41 is, accompanied by the rise of each pulse signal, sequentially changed to "1", "2", "3", . . . , which illuminates the LEDs in order, from the second to the eighth. Consequently eight kinds of stitch patterns on the right side half on the display panel 12 are consecutively indicated.

Figure 3:
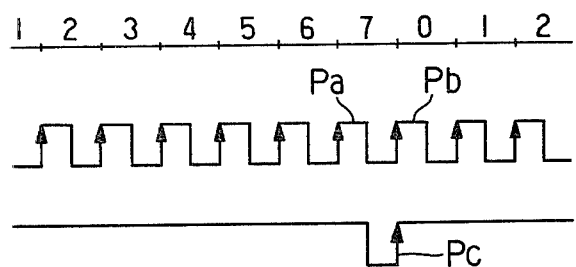
FIG. 3 is a timing diagram for explaining the operation mode of the trouble warning device.

When the seventh pulse signal falls a carry signal is produced from the CR terminal of the counter 41 (CR terminal becomes low leve as shown in FIG. 3), and accompanied by the rise of the eighth pulse signal the CR terminal rises to a high level. The state of the flip-flop circuit 44 is inverted in response to the rise of the carry signal to cause the Q terminal to assume high level and the $\overline{Q}$ terminal to assume low level. At the time of rising of the eighth pulse signal the significance of the counter 41 returns from "7" to "0", which renders the ninth LED 43b luminescent. As to the LEDs from the tenth to the sixteenth, they are illuminated in order, just like the sequence from the second to the eighth, at each rising of the input pulse signal from the counter 41. In such a process the 16 LEDs aree made luminescent sequentially one by one from right to left, and the 16 kinds of stitch patterns arranged on the display panel 12 with indicia will be displayed in the order. Each stitch pattern is displayed or indicated at an appropriate time interval, so that the operator may recognize each stitch pattern at every display changing.

In parallel with the above-mentioned indication of the stitch patterns, a pulse signal output from the oscillator 21 is, via the frequency divider 22 and the normal open switch 23, input to the address generator 51. An address is selected in response to the sequential order of the pulse signal inputs.

During the time span from the fall of the fifteenth pulse signal input to the counter 41 to the rise of the sixteenth pulse signal a carry signal is output from the CR terminal and the flip-flop circuit 44 returns to a reset state. And the decoder 42 outputs again a high level signal, at the time of rise of the sixteenth pulse signal, to a lead wire 42'.

If an operator wishes to select a pattern of the fourth indicium 12', from the extreme right of the display panel 12, she has to release the depressing of the push button 11 at the moment when this pattern has been indicated. Then the normal open switch 23 is opened to interrupt inputting of any signal to the counter 41. The fourth LED is maintained at luminescent state, leaving this pattern indicated on the display panel 12.

In response to the above-stated release of the push button 10, a starting address which corresponds to the selected pattern will be selected by the address generator 51, and the actuator 53 will act as predetermined based on the data produced at the data generator 52, which assures formation of the indicated stitch pattern on a work fabric.

Selection of stitch patterns is processed in the way mentioned above in this embodiment. The LED 43 also functions as a wearing lamp to effect notice to the operator of the occurrence of trouble in the machine.

If and when a trouble occurs, for example, overheat of the drive motor occurs in the machine a high level signal is given from the detector 31 to consequently open the AND gate 32, with a result of inputting a pulse signal from the oscillator 21 to the counter 41 without dividing the frequency thereof. As this pulse signal is not divided, the earlier stated operation in the counter 41, the flip-flop circuit 44, and the decoder 42 will be repeatedly produced in an extremely short span of time. Each LED is consequently lighted with an instantaneous cycle, so that the operator can not recognize which LED is presently luminescent. The LEDs light, depending on the frequency of pulse signals from the oscillator 21, sometimes at a so short time interval that all the LEDs appear to be lighted at the same time. The operator can recognize thereby an occurrence of something wrong in the machine.

As can be understood from the above description a first indication signal giving means is composed of, in this embodiment, the oscillator 21, the frequency divider 22, the normal open switch 23, the counter 41, the decoder 42, and the flip-flop circuit 44; and on the other hand a second indication signal giving means is composed of the oscillator 21, the AND circuit 32, the counter 41, the decoder 42, and the flip-flop circuit 44. In conclusion, the oscillator 21, the counter 41, the decoder 42, and the flip-flop circuit 44 are common components to both means.

The plural LEDs 43 which have originally been disposed on the display panel 12 with the purpose of indicating desired stitch patterns are also utilized in this invention as a trouble warning device. That is to say, if any trouble occurs in the machine the LEDs 43 are lighted, without special operation of the push button 11 by the operator, and furthermore lighted in sequence with an extremely short cycle of time in comparison to the ordinary lightening mode, giving an impression of all patterns being indicated at a time or repeated indication of 16 patterns in succession, from right to left, at a very rapid speed. Both are conspicuously different from the ordinary pattern indicating mode, which effectively function as a trouble warning.

This invention can be pratied and realized in various ways, not being limited to the above-mentioned embodiment. For example, the manually operable means for selecting a desired stitch pattern may be a plurality of push buttons, of which a specific one has to be depressed by the operator when needed, or may be series of channel type keys. As to the second indication signal supplying means, it may also be changed to one in which all the LEDs are actually lighted at a time or blinked at a time. Any indicating means which is capable of attracting attention of the operator for her noticing an abnormal state thereof will be satisfactory to the purpose. Indicating means for primarily indicating the selected stitch patterns can be also utilized, in this invention, as detailed above as a trouble indicating means if trouble happens in the machine. It favorably prevents the overlooking by the operator of a trouble occurrence, which naturally prevents a possible developing of the trouble into a more serious one or further an injurious one to the operator herself. What is important in this respect is that the effect can be realized economically and without a harm to the appearance of the machine.

What is claimed is:

1. In a multiple pattern sewing machine having stitch forming instrumentalities, manually operable means for selecting a desired stitch pattern from among a plurality of predetermined stitch patterns, pattern displaying means on the front of the machine for indicating each of said stitch patterns, and first supplying means responsive to the operation of said manually operable means for supplying an indication signal of stitch pattern to said pattern displaying means so as to indicate the selected stitch pattern, the improvement comprising:
(a) detecting means for detecting the occurrence of an abnormal condition in said machine and generating a signal indicative of detection of the abnormal condition;
(b) second supplying means responsive to the signal indicative of detection of the abnormal conditions for supplying an indication signal representing occurrence of the abnormal condition to said pattern displaying means and actuating said pattern displaying means to assume an abnormal condition warning state different from a pattern displaying state in which said selected stitch pattern is indicated.

2. In a multiple pattern sewing machine having stitch forming instrumentalities, manually operable means for selecting a desired stitch pattern from among a plurality of predetermined stitch patterns, a plurality of pattern displaying elements on the front of the machine for indicating each of said stitch patterns, said pattern displaying elements individually corresponding to said stitch patterns, and first supplying means responsive to the operation of said manually operable means for supplying an indication signal to said pattern displaying element corresponding to said selected stitch pattern, the improvement comprising:
(a) means for detecting the occurrence of abnormal condition in said machine and generating a signal indicative of detection of the abnormal condition;
(b) second supplying means responsive to the signal indicative of detection of the abnormal condition for successively supplying indication signals representing occurrence of the abnormal condition to said pattern displaying elements and actuating said elements to assume an abnormal condition warning state in which all of said stitch patterns are indicated.

3. The improvement according to claim 2, wherein said second supplying means includes pulse generating means for generating pulse signals of a given frequency, said first supplying means supplying pulse signals having a frequency less than said given frequency when said manually operating means is in one state and a particular indication signal for indicating said selected stitch pattern when said manually operated means is in a second state, distributing means for sequentially distributing said pulse signals having said frequency less than said given frequency as said indication signals to said plurality of pattern displaying elements, and gate means responsive to said signal indicative of detection of the abnormal occurrence for passing said pulse signals of given frequency from said pulse generating means toward said distributing means, whereby all of said displaying elements are sequentially energized during presence of said signal representing occurrence of the abnormal condition.

4. The improvement according to claim 3, wherein said first supplying means includes means for dividing the frequency of pulse signals of said given frequency from said pulse generating means, and said distributing means distributes the pulse signals of said divided frequency during periods when said manually operable means is in said first state.

5. The improvement according to claim 4, wherein said pattern displaying elements are respective light emitting diodes, and each of said stitch patterns is indicated by lighting a respective one of said light emitting diodes.

6. In a multiple pattern sewing machine having stitch forming instrumentalities, a manual switch accessessible to a sewing machine operator for selecting a desired stitch pattern from among a plurality of predetermined stitch patterns, said manual switch being normally in a first state and being changeable into a second state by the operator, a plurality of pattern displaying elements disposed correspondingly to said stitch patterns on the front of the machine for indicating each of said stitch patterns, and first supplying means for circularly supplying indication signals of a given constant frequency to said pattern displaying elements during closure of said manual switch and continually supplying an indication signal to said pattern displaying element corresponding to the stitch pattern which is indicated when said manual switch is open, the improvement comprising;
(a) means for detecting the occurrence of abnormal condition in the machine and generating a signal indicative of detection of the abnormal condition;
(b) generating means for generating pulse signals at a higher frequency than said given constant frequency;
(c) second supplying means for circularly supplying indication signals to said pattern displaying elements in response to pulse signals from said generating means; and
(d) gate means for passing said pulse signals toward said second supplying means regardless of the state of said manual switch while said signal indicative of detection of the abnormal condition is present.

7. In a multiple pattern sewing machine having stitch forming instrumentalities, manually operable means for selecting a desired stitch pattern from among a plurality of predetermined stitch patterns, pattern displaying means on the front of the machine for indicating each of said stitch pattens, first generating means for generating pulse signals in response to the operation of said manually operable means, and distributing means for distributing pulse signals from said first generating means to said pattern displaying means, the improvement comprising:
(a) detecting means for detecting the occurrence of abnormal condition in the machine and generating a signal indicative of detection of the abnormal condition;
(b) second generating means responsive to said signal indicative of detection of the abnormal condition for generating pulse signals at a predetermined period regardless of operation of said manually operable means;
(c) said distributing means being adapted to distribute pulse signals from said second generating means to said pattern displaying means, said plurality of stitch patterns being successively indicated, at said predetermined period, during occurrence of said signal indicative of the abnormal condition.

8. The improvement according to claim 6, wherein said pulse generating means includes an oscillator for generating pulse signals at a reference frequency, and said first supplying means includes a divider for dividing the reference frequency into said constant frequency.

9. In a multiple pattern sewing machine having stitch forming instrumentalities, manually operable means for selecting a desired stitch pattern from among a plurality of predetermined stitch patterns, a plurality of pattern displaying elements on the front side of said machine for indicating each of said stitch patterns, and first supplying means responsive to the operation of said manually operable means for supplying an indication signal of pattern to said pattern displaying element so as to indicate the selected stitch pattern, the improvement comprising:
(a) detecting means for detecting the occurrence of abnormal condition in said machine and generating a signal indicative of detection of the abnormal condition,
(b) second supplying means responsive to said signal indicative of detection of the abnormal condition for supplying an indication signal of abnormal condition to at least one element of said pattern displaying elements regardless of the operation of said manually operable means and actuating said pattern displaying elements to assume an abnormal condition warning state different from a pattern displaying state in which said selected stitch pattern is indicated.

* * * * *